J. H. MEANS.
MULTIPLE HAY PRESS.
APPLICATION FILED FEB. 24, 1908.
900,566.
Patented Oct. 6, 1908.
2 SHEETS—SHEET 1.
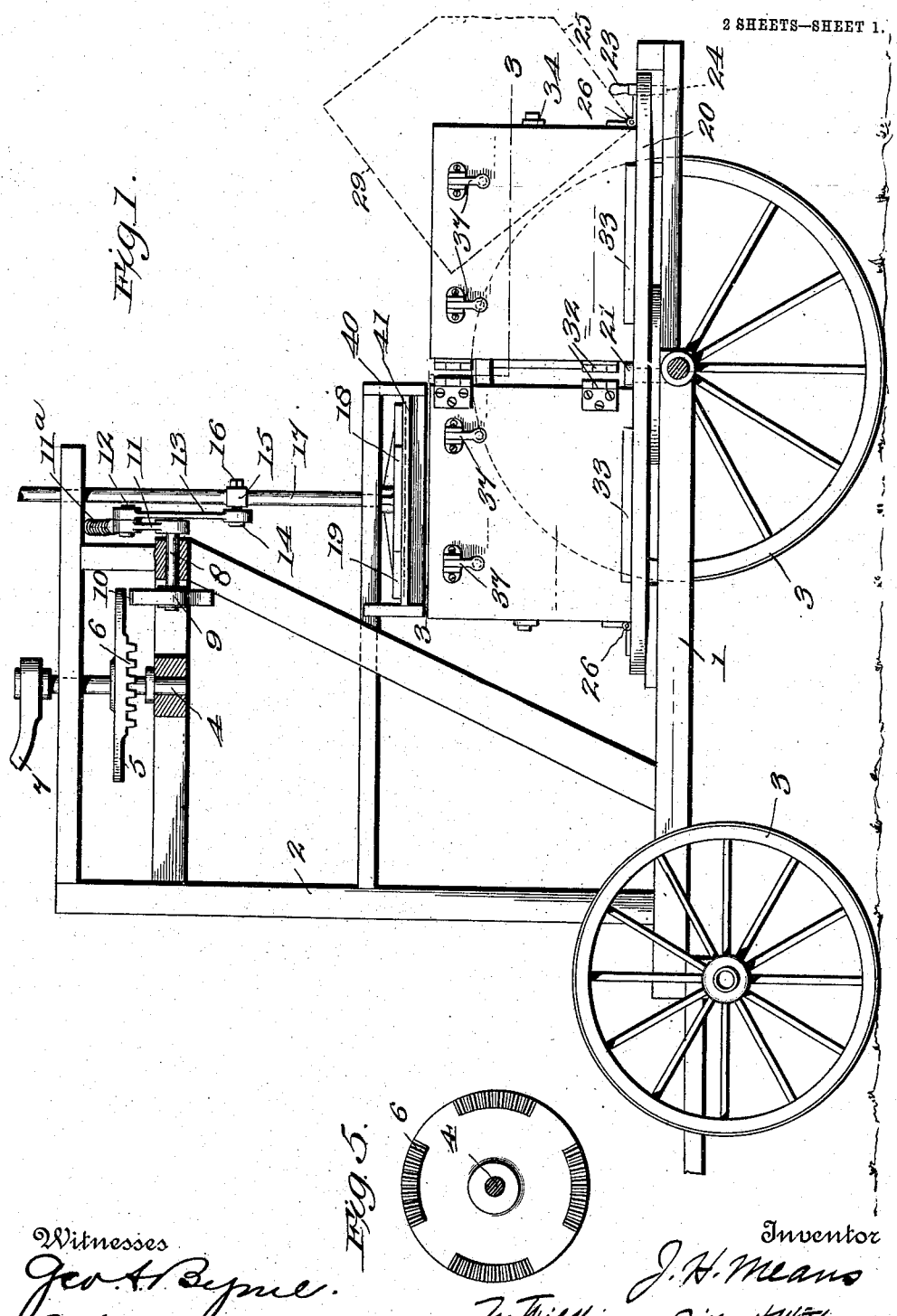
Witnesses
Inventor
J. H. Means
his Attorneys

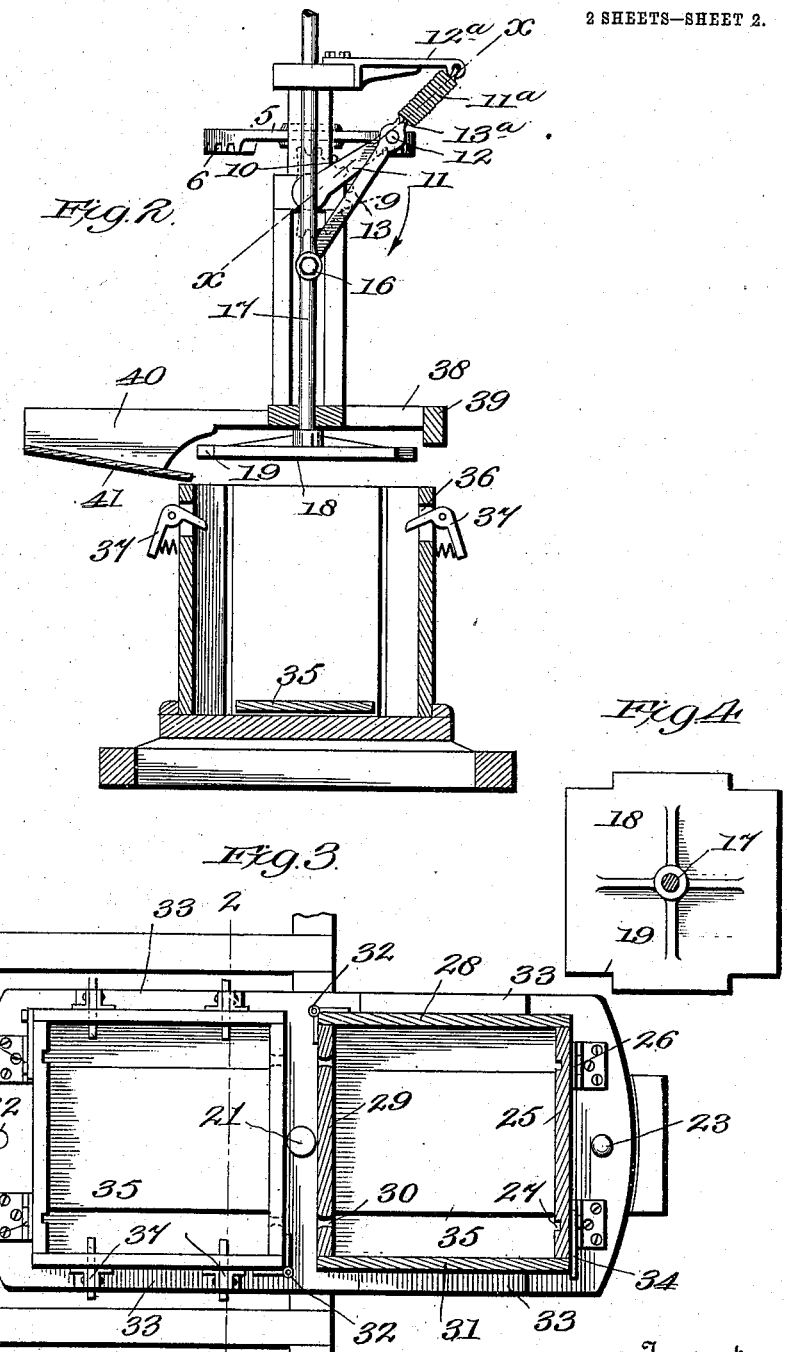

UNITED STATES PATENT OFFICE.

JESSIE H. MEANS, OF CARNESVILLE, GEORGIA.

MULTIPLE HAY-PRESS.

No. 900,566.   Specification of Letters Patent.   Patented Oct. 6, 1908.

Application filed February 24, 1908. Serial No. 417,450.

*To all whom it may concern:*

Be it known that I, JESSIE H. MEANS, a citizen of the United States, residing at Carnesville, in the county of Franklin and State of Georgia, have invented certain new and useful Improvements in Multiple Hay-Presses; and I do hereby declare the following to be a full, clear, and exact description of the invention, such as will enable others skilled in the art to which it appertains to make and use the same.

This invention relates to improvements in hay presses, and has for one of its objects to facilitate baling by providing means, coöperating with plunger mechanism, to enable one bale to be wired while another bale is being compressed in a separate press box.

Other objects and advantages will appear from the following description, and the particular features of novelty will be pointed out more succinctly in the claims.

While the invention is not restricted to the exact details shown and described, still for the purpose of disclosure reference is had to the accompanying drawings illustrating a practical embodiment of the invention, and in which—

Figure 1 is a side elevation of the improved baling press, one of the press boxes being also shown in dotted lines as being tilted outwardly in order to enable the bale to be wired. Fig. 2 is a vertical cross section substantially on the line 2—2 of Fig. 3. Fig. 3 is a horizontal section substantially on the line 3—3 of Fig. 1, one press box being shown in plan, and the other in horizontal section. Fig. 4 is a plan view of the plunger, and Fig. 5 is a bottom plan view of a segmentally toothed wheel for imparting intermittent motion to the plunger.

1 designates a base frame, 2 a vertical frame carried thereby, and 3 wheels forming part of a running gear for supporting the apparatus if desired. Suitably journaled in cross pieces on the vertical support 2 is a shaft 4 provided with a wheel or disk 5, having a plurality of segmentally - disposed toothed sections 6, (four being shown on the drawings) and the outer end of the shaft being provided with a power arm 7, to which horses may be hitched by suitable harnessing means, not shown.

8 designates a horizontal shaft suitably mounted in the frame 2, on one end of which is provided a toothed plate shown in the drawings as comprising a semi-circular disk 9 having a toothed periphery 10 coöperating with the segmentally-toothed portion 6 of the disk 5. On the other end of the shaft 8 there may be disposed a revolving member shown in the drawings as simply comprising a short crank arm 11, to which is pivotally mounted, as at 12, a link 13, which in turn, at its free end, is pivotally connected, as at 14, on a clamp member 15, adjustably secured by means of a bolt 16 to a plunger rod 17, suitably supported by the frame 2 and carrying at its lower end the plunger head 18. The plunger head may be cut away at its corners, as at 19, to permit the same to pass by the retaining dogs in the press box hereinafter referred to. A spring 11$^a$ may be disposed between a suitable bracket or support 12$^a$, and an apertured head 13$^a$ formed on the link 13, the bracket 12$^a$ being secured to the frame.

20 designates a platform for a plurality of press-boxes (two boxes being shown in the drawings), which platform is revolubly mounted on the base frame 1, as by means of an axis pin 21. This platform may be provided with suitable locking means to hold the press boxes in proper position with relation to the plunger, and in the drawings this means is shown as comprising apertures 22 through the platform at the front of the press boxes coöperating with a removable pin 23 adapted to pass through said apertures 22, and seated at its lower end in a recess or aperture 24 in the base frame.

The press boxes may be of any suitable construction, but in the drawings they are shown as comprising a front vertical wall 25 hinged at its lower end, as at 26, to the platform 20, and provided on its inside face with the vertical grooves 27. Fixed to this front wall is a vertical side wall 28, to which is hinged a rear wall 29 provided with vertical slots 30, and to this rear wall is fixed another side wall 31, the construction being such that the side and rear walls 29 and 31 may be swung conjointly on the hinges 32 independently of the front and side walls 25 and 28, and all of the walls, when locked together, may be swung conjointly on the forward hinges 26.

33 designates side strips on the platform to form blocks or chocks to assist in holding the press boxes rigidly in position, and 34 (Figs. 1 and 3) designate any suitable latching means for securing the wall 31 to the wall 25.

35 designates a base-board, which may be detachably held in horizontal grooves in the walls 25 and 29 when the several walls are locked rigidly together. This base-board, it will be noted, is of a width no greater than the distance between the vertical grooves 27 or slots 30. The side walls 28 and 31 may also be provided with the usual slots 36 to receive the usual retaining or follower dogs. These dogs may be of any suitable construction, but in the drawings are shown at 37 as comprising a pivoted member having a finger projecting through the slot 36 and a spring-controlled arm tending to hold said finger in the press box in engagement with the top layer of hay. There may also be provided adjacent said plunger a horizontally-disposed frame comprising side members 38 joined at one end by the cross bar 39, and at their other end provided with depending enlarged portions 40 joined laterally by an inwardly and downwardly inclining bottom 41, terminating to one side of the plunger, the said side walls 40 and bottom 41 forming a chute for feeding the loose hay into the press box.

One of the press boxes being in position beneath the plunger, it will be seen that as the shaft 4 is revolved the toothed segment 6 will intermittently engage the rack teeth 10 and revolve the crank arm 11 against the tension of the spring 11$^a$ until the link pin 12 passes below the plane indicated by the dotted line $x$—$x$, at which position the teeth 6 will have become disengaged from the teeth 10, and the plunger will be pulled upwardly by the spring 11$^a$ to the position shown in Fig. 2, and the operation repeated, so that as the hay is fed through the chute into the press box it is packed together very firmly and held down temporarily by the dogs 37. When the box has been filled, a grooved follower block may be placed therein and forced down below the dogs, so that the platform may be then swung around, and while the next box is being filled with hay and compressed the one just finished may be tied up with wires as customary.

In the operation of wiring the bale, and referring to the outside box in Figs. 1 and 3, it will be seen that the box is tilted until it rests on its forward face 25, in which position the wires may be passed around the bale through the medium of the grooves 27, the slots 30 and the grooves in the follower block, and after the bale has been tied up the latch 34 may be released, and the walls 31 and 29 swung around on the hinges 32 and the bale removed.

What I claim is:—

1. In a hay press, the combination of a plunger, means for operating same, a platform, and a press box hinged to said platform and comprising two pairs of walls, one pair hinged to the other to open laterally, substantially as described.

2. In a hay press, the combination of a plunger, a platform beneath same, and a press box hinged to said platform, said press box being formed of two sections hinged together, substantially as described.

3. In a hay press, the combination of a plunger, means for operating same, a platform, a press box hinged thereto and adapted to be tilted over on its hinged face, said press box being formed in two sections hinged together and adapted to swing in a plane at right angles to said hinged face, substantially as described.

4. In a hay press, the combination of a plunger and means for operating same, a revolving platform, and a plurality of press boxes having their forward walls hinged to said platform, said press boxes comprising a forward wall fixedly secured to a side wall and a rear wall fixedly secured to another side wall, said rear wall being hinged to said first-mentioned side-wall to swing laterally thereof, substantially as described.

5. In a press box, the combination of a support, a plunger rod, means for operating said plunger rod, a revolving platform, a plurality of press boxes carried by said platform, and a feeding trough carried by said support and comprising a frame adjacent said plunger and having enlarged depending side walls at the other end thereof, coöperating with an inclining bottom to form a feeding chute to said press boxes, substantially as described.

6. In a hay press, the combination of a press box, a plunger, and means for imparting intermittent reciprocating motion to said plunger comprising a link pivotally secured to said plunger; a rotatable member forming a crank pivotally connected to said link; means imparting motion to said rotatable member during a portion of its revolution; and means for completing the cycle of movement of said rotatable member comprising a spring connected at one end thereto and at its other end supported at a position distant therefrom, substantially as described.

7. In a hay press, the combination of a press box, a plunger and plunger rod, a link pivotally connected to said plunger rod at one end, a crank arm pivotally connected to the other end of said link, means for partially revolving said crank arm, and means for completing its cycle of revolution comprising a spring secured at one end to a suitable support, and at its other end secured to said link and crank connection, substantially as described.

8. In a hay press, the combination of a press box, a plunger and plunger rod, an adjustable member on said plunger rod, a link pivoted at one end to said adjustable member, a rotary crank pivoted to the other end of said link, means for initially imparting motion to said crank, and means for continuing said crank's cycle of operation comprising a spring interposed between said crank arm, and a suitable distant support, substantially as described.

9. The combination with a vehicle having an upright support thereon, a revolving platform carried thereby, a plurality of press boxes mounted on said platform, a plunger and plunger rod mounted on said upright support, a link pivoted at one end of said plunger rod, a stud shaft mounted on said support, a crank arm mounted on said stud shaft and pivotally connected to said link, a segmentally toothed rack mounted on the other end of said stud shaft, a disk having a plurality of toothed segmental portions and spaces therebetween coöperating with said rack, means for imparting rotary motion to said disk, and a suitably supported coiled spring connected at one end to said crank arm and link, substantially as described.

In testimony whereof, I affix my signature, in presence of two witnesses.

JESSIE H. MEANS.

Witnesses:
W. R. LITTLE,
G. G. ALLEN.